(12) United States Patent
Leplatois et al.

(10) Patent No.: US 8,329,309 B2
(45) Date of Patent: Dec. 11, 2012

(54) PAPER-BASED LIDDING FOR BLISTER PACKAGING

(75) Inventors: Ludovic Leplatois, Ile-Bizard (CA); Hojjat Nasseri, Dollard des Ormeaux (CA)

(73) Assignee: Winpak Heat Seal Packaging, Inc., Vaudreuil-Dorion (CA)

( * ) Notice: Subject to any disclaimer, the term of this patent is extended or adjusted under 35 U.S.C. 154(b) by 602 days.

(21) Appl. No.: 12/404,738

(22) Filed: Mar. 16, 2009

(65) Prior Publication Data

US 2010/0170820 A1    Jul. 8, 2010

Related U.S. Application Data

(63) Continuation-in-part of application No. PCT/CA2008/000429, filed on Feb. 28, 2008.

(51) Int. Cl.
*B32B 27/10* (2006.01)
*B65D 73/00* (2006.01)
*B65D 83/04* (2006.01)

(52) U.S. Cl. ............... 428/511; 428/211.1; 427/411; 206/462; 206/532

(58) Field of Classification Search ............ 428/511, 428/211.1; 427/411; 206/462, 532, 534
See application file for complete search history.

(56) References Cited

U.S. PATENT DOCUMENTS

| | | | |
|---|---|---|---|
| 6,265,041 B1 * | 7/2001 | Maeda | 428/36.6 |
| 2004/0104142 A1 * | 6/2004 | Dobler et al. | 206/531 |
| 2005/0037162 A1 * | 2/2005 | Adams | 428/34.2 |
| 2005/0077202 A1 * | 4/2005 | Blum et al. | 206/528 |
| 2006/0016718 A1 * | 1/2006 | Buss | 206/531 |
| 2006/0042987 A1 * | 3/2006 | Buss | 206/532 |
| 2007/0042147 A1 * | 2/2007 | Altman et al. | 428/35.7 |
| 2007/0068842 A1 * | 3/2007 | Pasbrig | 206/532 |
| 2007/0117759 A1 * | 5/2007 | Wannerberger et al. | 514/15 |
| 2008/0302695 A1 * | 12/2008 | Meeren et al. | 206/531 |
| 2009/0110888 A1 * | 4/2009 | Wuest et al. | 428/200 |

FOREIGN PATENT DOCUMENTS

JP        2003192053 A  *  7/2003

* cited by examiner

*Primary Examiner* — Lorna M Douyon

(74) *Attorney, Agent, or Firm* — Woods Oviatt Gilman LLP; Katherine H. McGuire, Esq.

(57) ABSTRACT

A paper-based lidding material includes a paper layer and a layer containing a cyclic olefin copolymer. The material is useful for blister packaging and particularly suitable for push-through pharmaceutical and food blister packaging. In one embodiment, the lidding material is formed by extrusion coating and includes at least one paper layer, at least one primer layer, at least one tie layer, at least one barrier layer containing one or more cyclic olefin copolymers, and at least one sealant layer in that order. In another embodiment, the paper-based lidding material includes a paper layer laminated to one or more barrier layers containing one or more cyclic olefin copolymers adjacent to one or more sealant layers. Embodiments of the invention can be sealed to a variety of blister films, including films that are chloride-free, to provide environmentally benign blister packages having good moisture properties.

16 Claims, 3 Drawing Sheets

PAPER-BASED LIDDING FOR BLISTER PACKAGING

CROSS REFERENCE TO RELATED APPLICATION

This application is a continuation-in-part of co-pending PCT application no. PCT/CA2008/000429 filed Feb. 28, 2008, the entirety of which is hereby incorporated by reference.

FIELD OF THE INVENTION

The present invention relates to a paper-based lidding material that provides a moisture barrier, can be sealed to a variety of blister films, and is particularly useful for push-through blister packaging.

BACKGROUND OF THE INVENTION

"Blister packaging" is a common term used for packaging having a bottom part, typically referred to as the "blister film", with a plurality of recesses formed therein (e.g., through vacuum forming or pressure forming) wherein a respective product piece (e.g., a consumable tablet or pill) is positioned and held therein. A cover, typically referred to as a "lidding foil" is placed over and sealed to the blister film about the perimeter of each recess.

There are basically three different types of blister packaging which relate to how the consumer is meant to retrieve the consumable from its respective recess within the sealed package: push-through type, peel-push type and lock type. In the "push-through" type of blister package, the consumer must use a finger to push against the malleable blister film at the location of a recess and continue pushing until the consumable in the recess is pressed against and breaks through the covering lidding foil. In the "peel-push" type of blister package, the consumer must first peel away an upper layer of a two layer lid stock to reveal the lower layer, and then push against the malleable blister film at the location of a recess and continue pushing until the consumable in the recess is pressed against and breaks through the lower layer of the lidding foil. The "peel-push" type package is considered more child-proof than the strictly push-through type due to the extra layer of lidding foil. In the "lock" type of blister package, the consumer can only get access to the recess content by destructing the lidding material using a tool like a pair of scissors, a knife, nails, etc. The present invention is primarily directed to the push-through or peel-push blister packaging, although it is noted that push-through is considered an integral part of a peel-push package. The push-through type of blister packaging is the most common package type for consumables in pill or tablet form such as chewing gum or pharmaceuticals.

Present day push-through blister packaging is manufactured with a lidding foil (typically aluminum foil) to which a heat seal lacquer is applied using gravure coating process. In the gravure coating process, the lacquer adhesive (e.g., vinyl acrylic lacquer) is dissolved in a solvent and applied to a steel roll engraved with a pattern of micro dimples or "cells". As the steel roll rotates, the cells on the surface pick up the lacquer either by passing through a bath of lacquer or by direct application of the lacquer to the steel roll. A roll of aluminum foil rolls a sheet of foil between the rotating steel roll and a rubber roll whereby a thin layer of the lacquer is transferred from the steel roll to the foil. The use of the gravure coating process thus allows a relatively thin layer of the lacquer to be applied to the lidding foil. The use of this process on push-through blister packaging lidding foils has therefore been the industry standard for many years since, if the foil sheet and/or the lacquer layer are too thick, the consumer would not be able to readily push and cleanly break through the lidding foil.

In an extrusion coating process, the adhesive is extruded through a die in the form of a molten polymer curtain that is applied to the continuously moving aluminum foil. If extruded too thinly, breaks within the curtain could cause voids, which could leads to breaches in the package seal. Present day peelable lidstock (e.g., as used in single serve food containers having a peel-away foil lid) is typically manufactured using either extrusion coating process, extrusion lamination process or gravure coating process. Extrusion coating/lamination employs different adhesives than are used in a gravure coating process, and the peel-away type of lidding foil is sufficiently thick to prevent inadvertent puncturing of the lid prior to opening the container. A thicker layer of sealant (as one gets with an extrusion coating process as compared to the gravure coating process) may therefore be used for peel-away lidding foils to ensure complete sealing, but is inadequate for push-through blister packaging application.

In present day push-through blister packaging, the blister film is typically formed from a polymeric material such as, for example, polyvinyl chloride (PVC), polyvinylidene dichloride (PVDC), a PVC/PVDC-combination, a PVC/PCTFE-combination or polystyrene (PS). During the packaging process, the consumables are placed in their respective recesses in the blister film and the lidding foil is positioned thereover. A heat press is then applied to seal the lidding foil to the blister film about the periphery of each recess to thereby seal the consumable within the package.

The polymers presently used for the blister film of the package either do not create a complete barrier to moisture and air, and/or they may contain plasticizers that are subject to blooming and can contaminate the consumable. Insufficient barrier properties allow moisture and air seepage into the package over time which shortens package shelf life. Also, contamination of the consumable by additive blooming may be harmful to human health. Some states such as California have recognized the potentially harmful effects of PVC in packaging for consumables and are considering enacting legislation prohibiting the use of PVC in food and pharmaceutical packaging. There is also concern that incineration of waste blister packages containing halogenated polymers can release toxic fumes into the environment.

There is thus presently a trend in the pharmaceutical industry toward the use of blister films made of materials which have better moisture and air barrier properties and are more inert than presently used polymeric blister films. Polychlorotrifluoroethylene (PCTFE), available from Honeywell under the trademark Aclar®, is one example of a material having these desirable properties. Cyclic olefin copolymers (COC) available from Topas Advanced Polymers represent another class of similarly suitable materials.

Unfortunately, for push-through type lidding foils, the heat seal lacquers presently used for push-through blister lidding foils exhibit difficulty adhering efficiently directly to PCTFE (Aclar®), COC, and other similar materials having the above beneficial properties. As such, it has been a practice in the industry, when making push-through blister packaging, to laminate the more beneficial PCTFE (Aclar®), COC, etc. to the less beneficial (and less expensive) PVC (or some other polymers such as polypropylene (PP), high density polyethylene (HDPE), linear low density polyethylene (LLDPE), and polystyrene (PS), for example) to form the blister film.

One present day industry manufacturing method then takes the conventionally manufactured push-through lidding foil with heat seal lacquer and seals it to the PVC side of the blister film to which the heat seal lacquer can efficiently adhere. This of course means the PVC side of the blister film must face the lidding foil and thus be in contact with the consumable. While this practice provides the benefit of the barrier properties of the PCTFE (Aclar®), COC, etc., the possibility of additive blooming is still present since it is the PVC layer which is in contact with the consumable inside the package. The ability to seal a push-through lidding foil directly to PCTFE (Aclar®), COC, etc. or similarly beneficial material would thus provide both an improved barrier and contact of the consumable with an inert material.

In certain cases it would also be desirable to replace lidding material that contains aluminum foil with a paper-based material. It is much easier to print on a paper support and this offers a significant advantage. However, paper does not provide the barrier to moisture that is afforded by aluminum foil and consequently, in many cases the contents of the blister package would not be sufficiently protected.

A considerable amount of technology related to blister packaging has been described previously. For example, sealant materials useful for peel-away lidstock are described in US Patent Application Serial Nos. 2005/0159549, 2005/0249903, and 2006/00104022, the disclosures of which are incorporated herein by reference, such materials including polymeric compositions that consist essentially of: about 10 to about 80 weight % of at least one ethylene/alkyl (meth)acrylate copolymer; about 5 to about 60 weight % of at least one polyolefin; 0 to about 35 weight % of at least one tackifying resin; and 0 to about 35 weight % of a filler such as, for example, talc.

The sealant materials described in the referenced patent applications are asserted to be useful to the pharmaceutical industry in user-friendly blister packaging for drugs in the form of pills, tablets, capsules and the like, and also for non-drugs such as poisons, catalysts, cleaning compositions, batteries, and various other goods. They may also be employed to seal lidded containers containing products such as yogurts, puddings, custards, gelatins, fruit sauces, cheese spreads and dips, meats, frozen or refrigerated meals, and dry foods such as noodle and snacks. The described sealant materials employed in various packaging applications are also asserted to provide a good heat seal that can be easily peeled.

U.S. Pat. No. 4,211,326, the disclosure of which is incorporated herein by reference, describes a push-through blister package that comprises a metal foil and a sheet provided with thermoformed pockets that comprises, prior to thermoforming, a laminate structure having outer layers of polyvinyl chloride (PVC) and an intermediate layer of fluid compression rolled, partially oriented polymeric material, for example, high density polyethylene (HDPE).

U.S. Pat. No. 6,010,784, the disclosure of which is incorporated herein by reference, describes a paperboard laminate for pharmaceutical blister packaging that employs a blend of a hot melt adhesive such as ethylene vinyl acetate (EVA) and calcium carbonate that is capable of sealing to Aclar®.

US Patent Application Serial No. 2007/0224379, the disclosure of which is incorporated herein by reference, describes a peelable child-resistant pharmaceutical blister lidstock for peel-push blister packaging that comprises a first layer of white polyester, a second layer of adhesive, a third layer of foil, and a fourth layer of a coating of a heat sealant such as a vinyl acrylic.

US Patent Application Serial No. 2002/0193031, the disclosure of which is incorporated herein by reference, describes a laminate for blisters and pouches that comprises a metal foil having an uncoated surface which has been directly heat sealed to the surface of a polymeric web by an outer surface of the web, wherein the outer surface comprises a blend of an EVA copolymer and an additive that embrittles the copolymer at room temperature. The polymeric web may be a laminate that includes a polyolefin core and a second outer surface that may be a polychlorotrifluoroethylene. The laminate is asserted to be useful in producing press-through packages, where it will not peel open when tablets are pushed through it, and also in producing pouches, where it will peel.

US Patent Application Serial No. 2005/0058793, the disclosure of which is incorporated herein by reference, describes a coextruded multilayer heat sealant structure that comprises a first layer of a thermoplastic polymeric material, a second layer of low density polyethylene, and a third layer of a single site catalyzed polyethylene for use as a heat sealant layer, the heat sealant structure being laminated to a substrate such as aluminum foil.

U.S. Pat. No. 7,316,317, the disclosure of which is incorporated herein by reference, describes a package that comprises a polymeric base sheet such as PVC containing recesses and a sealing web that includes a metal foil adhered to a polymeric web, for example, polyethylene terephthalate (PET). The sealing web has strength sufficient to prevent a packaged item in a recess from being pushed through by pressure applied to the recess. A portion of the package where the base web is sealed to the sealing web includes lines of weakness that allow the packaged item to be pushed through the sealing web.

US Patent Application Serial No. 2006/0199022, the disclosure of which is incorporated herein by reference, describes a blister pack that includes a laminate of a metal foil adhered to a water permeable layer by an adhesive that can be softened on exposure to water. A packaged item cannot be pushed through the foil until the adhesive is softened by water, thereby allowing removal of the water permeable layer from the foil.

U.S. Pat. No. 6,224,973, the disclosure of which is incorporated herein by reference, describes a multi-layer sheet suitable as a sealable or peelable sheet specially used for closing foodstuff containers or blisters. This multi-layer sheet comprises a tie-layer between a substrate layer and a seal or a peel. This multilayer sheet is prepared by extrusion or coextrusion coating. This patent describes the beneficial use of mineral filler for achieving ease of peelability, but not does not describe how to provide ease of push-through for push-through blister packaging.

U.S. Pat. No. 5,145,737, the disclosure of which is incorporated herein by reference, describes a system for closure and subsequent opening of a sterilizable container, which is made up of a cover having a sealing layer, which bonds to the cover, and where the sealing layer is made of a polymeric material such as high density polyethylene, polypropylene and polyester and the container, at the point where the cover is sealed to the container, and is also made of the same polymeric material as the cover's sealing layer. An inert filler is incorporated into the sealing layer and can also be incorporated into the container where the cover and container are joined. However, this patent does not describe how to provide ease of push-through for push-through blister packaging.

US Patent Application Serial No. 2005/0077202, the disclosure of which is incorporated herein by reference, describes blister packages which are formed from multilayered films having a lid-stock film which is heat sealed directly to a fluoropolymer film. A polymeric base layer is adhered to a fluoropolymer layer via a first intermediate adhesive tie layer; a support layer is adhered to the fluoropolymer layer via a second intermediate adhesive tie layer; and a metallic foil layer is adhered to the support layer via a third intermediate adhesive tie layer. However, this patent also does not describe how to provide ease of push-through for push-through blister packaging.

While the above patents and applications describe various lidding foils, blister films, and sealants for blister packaging, neither the industry nor the prior patent publications above have provided paper-based lidding material for push-through blister packaging that can be formed by extrusion coating or by lamination and that provide good moisture barrier properties and that further can be sealed directly to a chloride-free blister film such as PCTFE (Aclar®), COC, or similarly environmentally benign material and can provide good push-through properties.

SUMMARY OF THE INVENTION

The present invention successfully addresses the above deficiencies of the prior art by providing a multilayer paper-based lidding material, including a paper layer and a layer containing a cyclic olefin copolymer. The material is useful for blister packaging and particularly suitable for push-through pharmaceutical and food blister packaging. In one embodiment, the lidding material is formed by extrusion coating and includes at least one paper layer, at least one primer layer, at least one tie layer, at least one barrier layer containing one or more cyclic olefin copolymers, and at least one sealant layer. In another embodiment, the paper-based lidding material includes a paper layer laminated to one or more barrier layers containing one or more cyclic olefin copolymers, and at least one sealant layer.

Desirably, materials are chosen so that the push-through ability of the lidding foil is characterized by a Mullen burst strength of about 10 psi to about 30 psi and an MD tear strength of about 30 to about 100 grams-force. The paper-based lidding material of the present invention may be heat sealed to a polymeric blister film to form a push-through blister pack, although the paper-based lidding material may of course be used in other types of blister packaging as desired (e.g., peel-push type or lock type).

Figure 1:
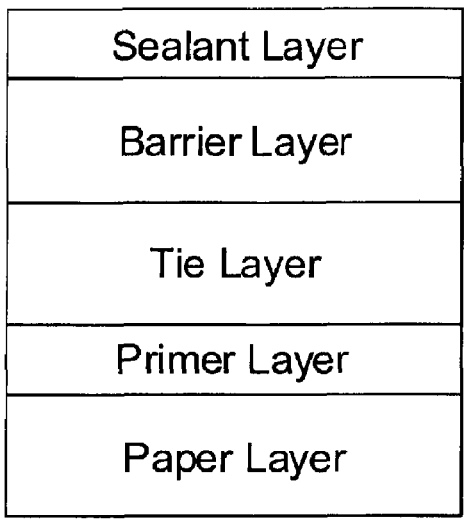
FIG. 1 shows a schematic cross-sectional view of one embodiment of the present invention prepared by extrusion coating.
Figure 2A:
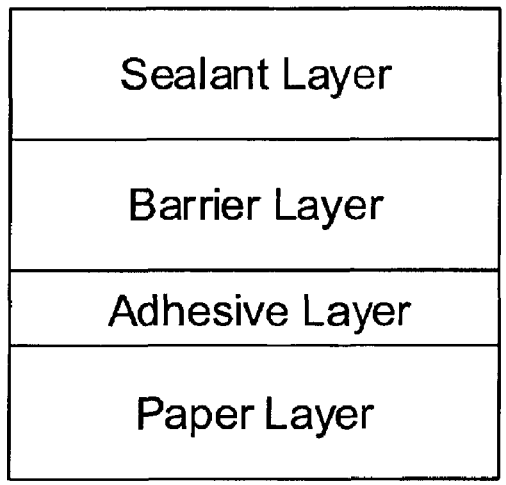
FIG. 2A shows a schematic cross-sectional view of another embodiment of the present invention prepared by lamination having separate barrier and sealant layers.
Figure 2B:
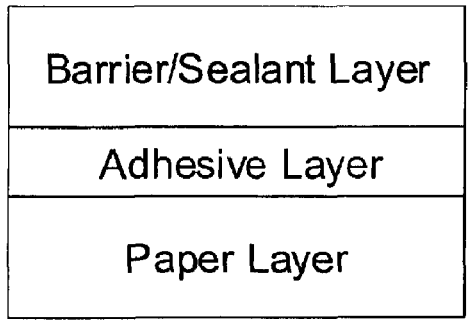
FIG. 2B shows a schematic cross-sectional view of another embodiment of the present invention prepared by lamination having a single barrier/sealant layer.

It will be understood that FIG. 1, FIG. 2A-and FIG. 2B are not to scale since the individual layers are too thin and the thickness differences of various layers are too great to permit depiction to scale.

Figure 3A:
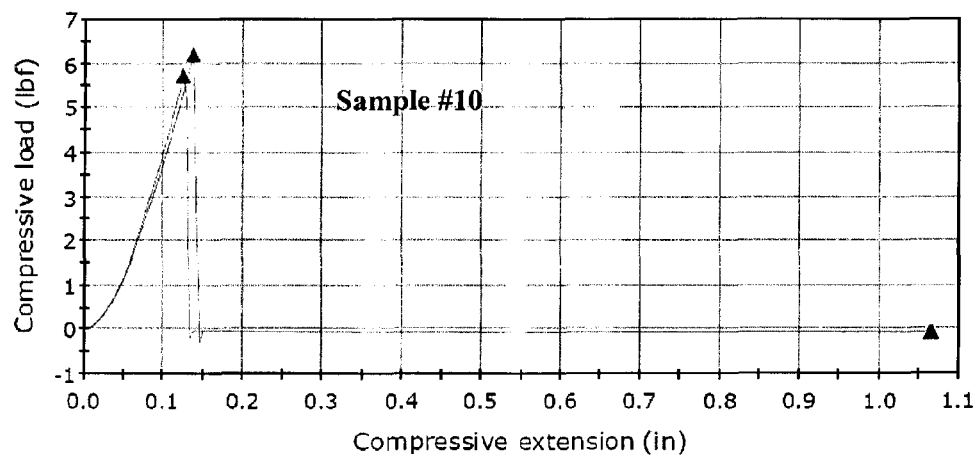

FIG. 3A is a plot of push-through force versus displacement for sample 10.

Figure 3B:
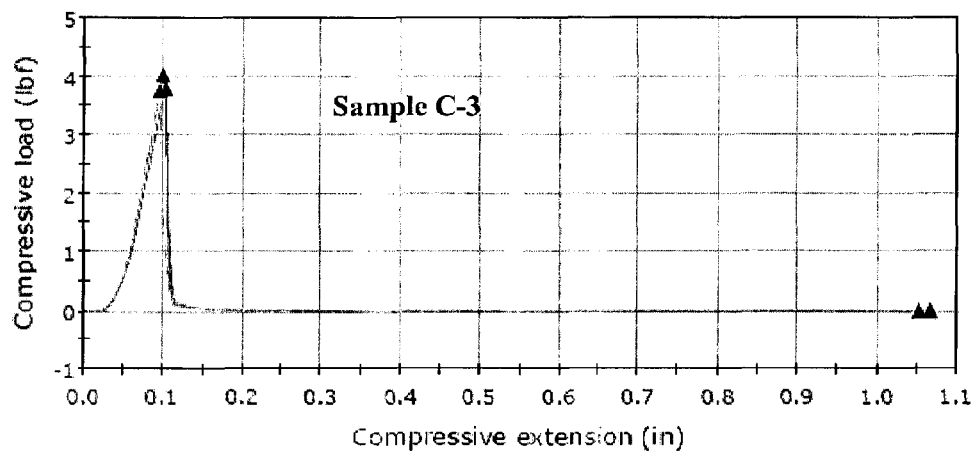

FIG. 3B is a plot of push-through force versus displacement for sample C-3.

Figure 4:
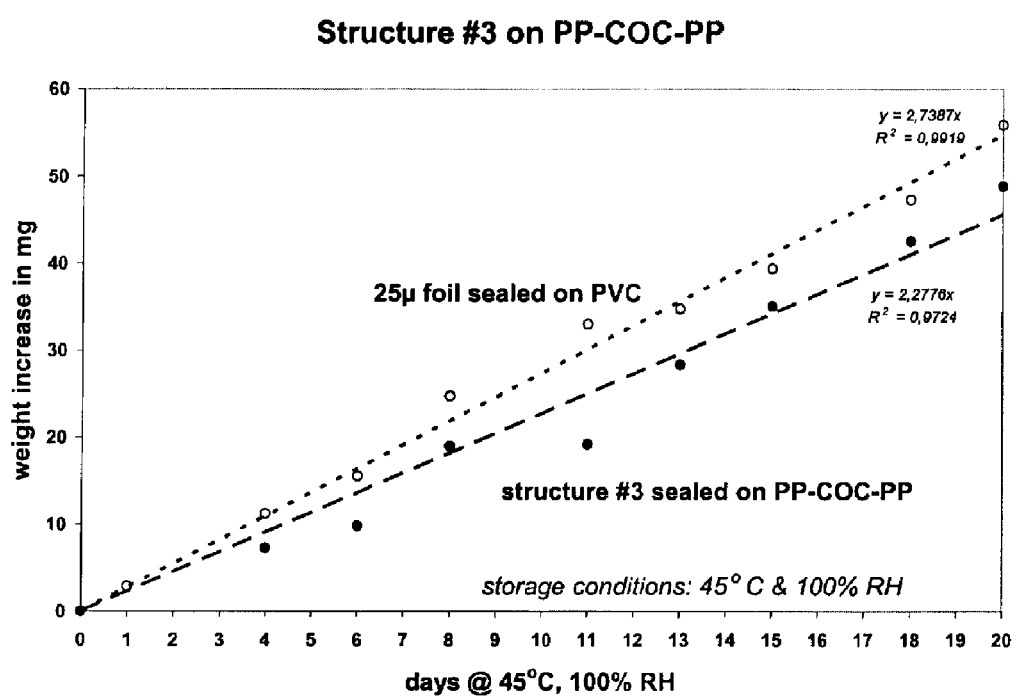

FIG. 4 is a plot of weight gain (mg) versus time (days) for examples 8-1 and 8-25.

DETAILED DESCRIPTION OF THE INVENTION

The present invention provides a paper-based lidding material particularly suitable for push-through type pharmaceutical and food blister packaging although it is envisioned the paper-based lidding material may be useful in other packaging applications.

In one embodiment, a paper-based lidding material comprises base layer containing paper; a primer layer gravure-coated on the paper; a tie layer extrusion coated on the paper layer; a barrier layer, containing a cyclic olefin copolymer, extrusion coated on the tie layer; and a sealant layer extrusion coated on the barrier layer. The tie, barrier, and sealant layers are extrusion coated either simultaneously or sequentially onto the paper base. FIG. 1 depicts schematically a paper-based lidding material prepared by extrusion coating.

In some embodiments, the paper layer is typically about 1.4 mil in thickness, the primer layer has a thickness of about 1 micron, the tie layer often has a thickness of about 0.2 mil, the barrier layer typically has a thickness of about 0.3 to 0.8 mil, and the sealaent layer is frequently about 0.3 mil in thickness.

In one embodiment, the paper has a thickness corresponding to 10 to 30 pounds/ream. The paper can contain printing inks and overvarnishes on one or both sides.

In another embodiment, the tie layer is extrusion coated to a coatweight of about 1 to about 10 pounds per ream, the barrier layer is extrusion coated to a coatweight of about 1 to about 20 pounds per ream and the sealant layer is extrusion coated to a coatweight of about 1 to about 10 pounds per ream.

Desirably, base, primer, tie, barrier, and sealant materials are selected so that the resultant paper-based lidding material is characterized by a Mullen burst strength of about 10 psi to about 30 psi and an MD tear strength of about 30 to about 100 grams-force. Preferably, the lidding material is characterized by a Mullen burst strength of less than about 30 psi and a tear strength of less than about 50 g/in. and a moisture vapor transmission rate of less than about 0.3 g per 100 in$^2$ per day.

The tie layer can be a polymer. Non-limiting examples of suitable tie materials include:
 a) polyethylene;
 b) ethylene acid copolymer;
 c) ethylene acetate copolymer;
 d) ethylene acrylate copolymer
 e) ethylene anhydride copolymer
 f) modified ethylene acrylate copolymer;
 g) ionomer;
 h) polypropylene;
 i) anhydride-grafted polypropylene; and
 j) a mixture of two or more of a-i.

The barrier layer can be a polymer and at least one barrier layer includes a cyclic olefin copolymer. An example of a COC is shown below (Formula I), wherein n and p represent integers. Desirably, n and p are chosen so that the compound has a melting point of 150° C. or greater.

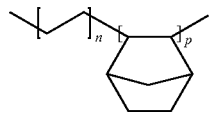

Formula I

Many COC materials are commercially available from companies such as Topas Advanced Polymers, Inc., 8040 Dixie Highway, Florence, Ky. Non-limiting examples of suitable cyclic olefin copolmer materials available from Topas include product code 8007, 5013, 6013, 6015, and 6017 as described in their COC product brochure published March 2006.

The sealant layer can be a polymer. Non-limiting examples of suitable sealant materials include:
   a) polyethylene;
   b) polypropylene;
   c) ethylene acrylate copolymer;
   d) ethylene acetate copolymer;
   e) modified ethylene acrylate copolymer;
   f) modified ethylene acetate copolymer;
   g) ionomer; and
   h) a mixture of two or more of a-g.

In one embodiment, the primer is a polyamine or polyacetate. Suitable primers for forming the primer layer are polyethylene amine and polyvinyl acetate. Preferably, the primer is ADCOTE™ 1544H available from Rohm and Haas Company.

In another embodiment, the paper-based lidding material includes a base layer containing paper, an adhesion layer, and a film with both at least a barrier layer and at least a sealant layer, wherein the barrier layer of the film contains at least one cyclic olefin copolymer. By way of example, FIG. 2A depicts schematically such a paper-based lidding material prepared by lamination, which contains the corresponding paper, adhesion, and barrier and sealant layers.

In some embodiments, the adhesive layer is often about 0.1 to 0.2 mil in thickness. The barrier layer is typically about 0.7 mil thick and the sealant layer is often about 0.3 mil in thickness.

In one embodiment, the lidding material can be fabricated through adhesive lamination of the paper base to a barrier film (containing a cyclic olefin copolymer) and wherein the barrier film also includes a sealant material. Thus, a separate sealant layer is not present and a barrier/sealant layer is formed as depicted in FIG. 2B. In this case, the barrier/sealant layer, corresponding to the barrier material and sealant material, is often about 0.5 to about 2 mil in thickness and typically about 1 mil in thickness.

In a further embodiment, an embrittling agent is mixed into one or both of the tie and sealant layers in an amount of about 5 to about 50% by weight, and more preferably in an amount of about 10 to about 30% by weight. The embrittling agent is preferably a mineral and may be one or more of calcium carbonate, calcium sulfate, glass fiber, kaolin, mica, silica, talc, and wollastonite, for example. The embrittling agent may be equally or non-equally distributed in one or both of the tie and sealant layers. For example, the embrittling agent may be non-equally distributed in the sealant layers with a higher concentration in one sealant layer toward the tie layer.

Embodiments of the invention can provide paper-based lidding material for blister packaging that have low moisture transmission, excellent push-through properties, can be easily printed, and can be sealed to a variety of blister films, including blister films that do not contain PVC. The invention and its advantages are further illustrated by the specific examples that follow.

EXAMPLE 1

Preparation of Inventive Samples 1-9 by Extrusion Coating

A series of paper-based lidding samples having the structure shown in Table 1A were prepared by extrusion coating.

TABLE 1a

Lidding Samples Prepared By Extrusion Coating.

| Sample | Base Layer (weight)) | Primer (lb/ream) | Tie Resin (amount) | Barrier Resin (amount) | Sealant Resin (amount) |
|---|---|---|---|---|---|
| 1 (Inventive) | unprinted BLMG (25#) | Adcote ™ 1544H (0.025) | PE5050 (7 lb/ream) | Topas ® 8007F-400 (11 lb/ream) | Appeel ® 20D828 (6 lb/ream) |
| 2 (Inventive) | printed BLMG (25#) | Adcote ™ 1544H (0.025) | PE5050 (7 lb/ream) | Topas ® 8007F-400 (11 lb/ream) | Appeel ® 20D828 (6 lb/ream) |
| 3 (Inventive) | unprinted BLMG (15#) | Adcote ™ 1544H (0.025) | PE5050 (3 lb/ream) | Topas ® 8007F-400 (10.5 lb/ream) | Appeel ® 20D828 (6 lb/ream) |
| 4 (Inventive) | printed BLMG (15#) | Adcote ™ 1544H (0.025) | PE5050 (3 lb/ream) | Topas ® 8007F-400 (9 lb/ream) | Appeel ® 20D828 (6 lb/ream) |
| 5 (Inventive) | printed BLMG (20#) | Adcote ™ 1544H (0.025) | PE5050 (3 lb/ream) | Topas ® 8007F-400 (9 lb/ream) | Appeel ® 20D828 (6 lb/ream) |
| 6 (Inventive) | printed C1S (25#) | Adcote ™ 1544H (0.025) | PE5050 (3 lb/ream) | Topas ® 8007F-400 (10.5 lb/ream) | Appeel ® 20D828 (6 lb/ream) |
| 7 (Inventive) | printed C1S (25#) | Adcote ™ 1544H (0.025) | PE5050 (3 lb/ream) | Topas ® 8007F-400 (9 lb/ream) | Appeel ® 20D828 (6 lb/ream) |
| 8 (Inventive) | printed BLMG (15#) | Adcote ™ 1544H (0.025) | PE5050 (3 lb/ream) | Topas ® 8007F-400 (6 lb/ream) | Appeel ® 20D828 (6 lb/ream) |
| 9 (Inventive) | printed BLMG (15#) | Adcote ™ 1544H (0.025) | PE5050 (3 lb/ream) | Topas ® 8007F-400 (7.5 lb/ream) | Appeel ® 20D828 (6 lb/ream) |

BLMG refers to bleached machine glazed paper available from Dunn Paper Company, product code 912. C1S paper refers to POINTFLEX® paper available from StoraEnso Company. The term Printed indicates that both sides of the paper contain printing inks. Adcote™ 1544H is available from the Rohm and Hass Company. PE5050 is available from Huntsman Chemical. In some cases the equivalent material (product code: 808P) from Westlake was used. Topas®8007F-400 is available from Topas Advanced Polymers. Appeel® 20D828 is available from E.I. du Pont de Nemours and Company.

EXAMPLE 2

Preparation of Inventive Sample 10 via Adhesive Lamination

A series of films were prepared using a cast film process and having the composition shown in Table 2A. The Topas® materials contain COC and are available from the company Topas Advanced Polymers.

TABLE 2A

Barrier Films Useful For Lamination.

| Film reference | Mono or multilayer | Film thickness (mil) | Film composition |
| --- | --- | --- | --- |
| A | mono-layer | 1 mil | Topas ® 8007F-400 |
| B | mono-layer | 2 mil | Topas ® 8007F-400 |
| C | mono-layer | 2 mil | Topas ® 9506 |
| D | mono-layer | 2 mil | Topas ® 5013X4 |
| E | multi-layer | 1 mil | Topas ® 8007F-400/Appeel ® 20D828 (7:3 layer ratio) |
| F | mono-layer | 1 mil | Blend of 70% Topas ® 8007F-400 + 30% Appeel ® 20D828 |
| G | multi-layer | 1 mil | Topas 5013X4/Appeel 20D828 (7:3 layer ratio) |
| H | mono-layer | 1 mil | Blend of 70% Topas ® 8007F-400 + 30% Appeel ® 20D828 |
| I | multi-layer | 1 mil | 80% Topas ® 5013X4 + 20% LLDPE/Appeel ® 20D828 (7:3 layer ratio) |

Inventive sample 10 was prepared by laminating paper to barrier film I (Table 2A) using the adhesive shown in Table 2B.

TABLE 2B

Lidding Samples Prepared By Miscellaneous Methods.

| Sample | Method Manufacture | 1$^{st}$ Layer | 2$^{nd}$ Layer | 3$^{rd}$ Layer |
| --- | --- | --- | --- | --- |
| 10 (Inventive) | Lamination | BLMG (15#) | Tycel ® 7966 (1.5 lb/ream) Tycel ® 7287 (0.2 lb/ream) | Film I (Table 2A) |

Tycel ® 7966 (adhesive base polymer) and Tycel ® 7287 (adhesive coreactant) are available from Liofol Company.

EXAMPLE 3

Preparation of Comparative Samples C-1 Through C-5

Comparative lidding samples C-1 through C-5, having the structure shown in Table 3, were prepared by the method listed in Table 3.

TABLE 3

Comparative Lidding Samples Prepared By Miscellaneous Methods.

| Sample | Method Manufacture | 1$^{st}$ Layer | 2$^{nd}$ Layer | 3$^{rd}$ Layer | 4$^{th}$ Layer |
| --- | --- | --- | --- | --- | --- |
| C-1 (Comparision) | Gravure Coating | Print primer (0.375 lb/ream) | 25 μm soft foil | Heat Seal Lacquer (3.25 lb/ream) | None |
| C-2 (Comparision) | Gravure Coating | Print primer (0.9 lb/ream) | 25 μm hard foil | Heat Seal Lacquer (3.85 lb/ream) | None |
| C-3 (Comparision) | Gravure Coating | Print primer (0.9 lb/ream) | 25 μm hard foil | Heat Seal Lacquer (2 lb/ream) | None |
| C-4 (Comparision) | Extrusion Coating | Print primer (0.9 lb/ream) | 25 μm soft foil | PE5050 (4 lb/ream) | Appeel ® 20D828 (6 lb/ream) |
| C-5 (Comparision) | Extrusion Coating | Printed C1S Paper (30#) | Adcote ™ 1544H (0.025) | LDPE (15 lb/ream) | None |

Robond® HS FP1-1015, available from Rohm & Haas, was employed as the heat seal lacquer in control samples 1 and 2. Soft foil refers to aluminum foil that has been annealed; hard foil refers to aluminum foil that has not been annealed.

EXAMPLE 4

Mechanical Properties of Lidding Samples

Mechanical properties were measured for lidding samples 1-10 and comparative samples C-1 through C-5 (Table 4A) and barrier films A through I (Table 4B).

TABLE 4A

Mechanical Properties of Lidding Samples.

| Sample | Mullen Burst (psi) | Puncture Strength (lbf) | MD Tear Strength (lbf) | TD Tear Strength (lbf) |
| --- | --- | --- | --- | --- |
| 1 | 22.7 | 11.0 | 56.1 | 78.6 |
| 2 | 25.8 | 13.2 | 223 | 270.5 |
| 3 | 18.8 | 8.5 | 28.6 | 42 |
| 4 | 16.9 | 7.7 | 32.9 | 34.1 |
| 5 | 21.3 | 8.4 | 41.4 | 48.1 |
| 6 | 25.0 | 9.2 | 56.1 | 50 |
| 7 | 25.1 | 9.3 | 48.2 | 46.3 |

TABLE 4A-continued

Mechanical Properties of Lidding Samples.

| Sample | Mullen Burst (psi) | Puncture Strength (lbf) | MD Tear Strength (lbf) | TD Tear Strength (lbf) |
|---|---|---|---|---|
| 8 | 15.7 | 4.7 | 29.3 | 32.1 |
| 9 | 16.3 | 6.4 | 31.4 | 34.9 |
| 10 | 17.0 | 5.4 | 23.8 | 34.7 |
| C-1 | 25.7 | 11.1 | 16.7 | 18.9 |
| C-2 | 29.7 | 6.7 | 21.3 | 21.9 |
| C-3 | 22.8 | 4.4 | 11.0 | 11.6 |
| C-4 | 13.3 | 5.4 | 64.2 | 73.9 |
| C-5 | 19.4 | 3.5 | 87.1 | 85.9 |

TABLE 4B

Mechanical Properties of Films.

| Sample | Mullen Burst (psi) | Puncture Strength (lbf) | MD Tear Strength (lbf) | TD Tear Strength (lbf) |
|---|---|---|---|---|
| A | 9.3 | 18.6 | 13.4 | 21.3 |
| B | 14.3 | 20.4 | 26.8 | 33.5 |
| C | 16.5 | 24.8 | 30.5 | 31.1 |
| D | 11.8 | 4.2 | 12.2 | 13.4 |
| E | 15.8 | 8.8 | 7.0 | 6.1 |
| F | 12.0 | 3.4 | 7.3 | 7.9 |
| G | 2.5 | 0.7 | 18.9 | 34.1 |
| H | 3.0 | 1.0 | 6.6 | 6.1 |
| I | 3.4 | 1.4 | 7.3 | 8.5 |

One can see from Table 4A that many of the inventive lidding structures provide mechanical properties that are very similar to those of the comparative samples. Often good lidding materials for a push-through blister package applications exhibit low puncture or burst strength accompanied with the lowest tear strength possible. In particular, sample 8 and 10 have excellent properties for good push-through.

EXAMPLE 5

Push-Through Measurement

Push-through characteristics were determined for samples 10 and C-3 by performing a puncture test using a cylindrical head moving at 5 inch/min speed and the results are reported in Table 5. Plots of the Compression Load (lbf) versus Compression Extension for samples 10 and C-3 are shown in FIG. 3A and FIG. 3B for duplicate measurements.

TABLE 5

Push-Through Characteristics.

| Sample | Max load (lbf) | Energy at max load (mJ) | Energy at break (mJ) | Elongation at max load (EML) (in) | Elongation at break (EB) (in) | EB-EML |
|---|---|---|---|---|---|---|
| 10 | 5.96 | 33.6 | 36.7 | 0.13 | 0.14 | 0.01 |
| C-3 | 3.87 | 12.5 | 14.9 | 0.10 | 0.11 | 0.01 |

A more brittle rupture mode is preferred for blister packaging applications. One measure of good brittle rupture mode is the difference between the elongation at break and the elongation at maximum load (EB-EML), which should be very small. As can be seen from Table 5, both sample 10 and C-3 provide good push-through characteristics. In FIG. 3A, and FIG. 3B, the energy corresponds to the area under the curve and is the work, i.e., force times displacement. The closer the total energy is to the energy at peak, the more brittle is the tested structure. The figures indicate that both sample 10 and C-3 have good brittle properties.

EXAMPLE 6

Determination of Sealing Properties

The sealing properties of paper-based lidding materials 1, 4, 5, and 7 with four blister films corresponding to 250μ PVC, 250μ PP, 250μ PP/COC/PP, which corresponds to a layer of COC between two layers of PP, and 250μ APET were determined at a pressure of 40 psi, a temperature of 425-° F., and a time of 0.7 seconds. Appeel® 20D828 from Dupont used in the sealing layer of extrusion-coated lidding materials of this invention (Table 1A) is a modified ethylene acrylate copolymer that contains talc in-situ in its composition. This resin provides significantly good sealing performance on most polymeric material. Sealing results for samples 1-7 in lbf/in are listed in Table 6.

TABLE 6

Sealing Properties (lbf/in).

| Samples | 250μ PVC | 250μ PP | 250μ PP/COC/PP | 250μ APET |
|---|---|---|---|---|
| 1 | 8.89 | 7.49 | 7.35 | 4.41 |
| 4 | 4.88 | 3.83 | 3.83 | 2.42 |
| 5 | 5.00 | 5.17 | 4.71 | 2.83 |
| 7 | 4.77 | 4.05 | 3.77 | 3.18 |

Typical minimum sealing force required for blister packaging applications is on the order of 2.0 lbf/in. However, sealing force above 2.5 lbf/in. is by far preferable to ensure good impermeability and integrity of the whole packaging. As can be seen from Table 6, the inventive samples provide excellent sealing. This table exhibits the universality of the sealant layer to 4 different polymeric blister films. More generally, these structures are sealable to PVC, PVDC, PS, HIPS, PET, PP, HDPE, LLDPE, LDPE, SBC, PCTFE (Aclar®), COC, Barex® resins, PLA and BOPA.

EXAMPLE 7

Moisture Barrier Properties

The moisture vapor transmission rates were measured for several of the samples. The rates were also calculated for all samples using standard literature equations. Results are reported in Table 7.

TABLE 7

Measured and Calculated Moisture Vapor Transmission Rates (MVTR).

| Sample | Calculated MVTR (g/100 in²/day) | Measured MVTR (g/100 in²/day) |
|---|---|---|
| 1 | 0.241 | not measured |
| 2 | 0.241 | 0.236 |
| 3 | 0.265 | not measured |
| 4 | 0.303 | 0.303 |
| 5 | 0.303 | 0.265 |
| 6 | 0.265 | not measured |
| 7 | 0.303 | 0.290 |
| 8 | 0.425 | not measured |
| 9 | 0.353 | not measured |
| 10 | 0.272 | not measured |
| C-1 | 0 | 0 |
| C-2 | 0 | 0 |

TABLE 7-continued

Measured and Calculated Moisture Vapor Transmission Rates (MVTR).

| Sample | Calculated MVTR (g/100 in²/day) | Measured MVTR (g/100 in²/day) |
|---|---|---|
| C-3 | 0 | 0 |
| C-4 | 0 | 0 |
| C-5 | 1.299 | not measured |

Measured MVTR data was very consistent with the corresponding calculated values and indicates that the calculation model for barrier properties is extremely accurate. As a reference, an extrusion-coated paper with 15 lb/ream of LDPE (sample C-5) will exhibit a MVTR of approximately 1.3 g/100 in²/day. The inventive structures (samples 1-10) provide at least 3 times better moisture protection relative to conventional material used for pouchstock. In addition, these high moisture barrier blister papers are easily push-through breakable whereas LDPE-coated papers would be extremely difficult to perforate.

EXAMPLE 8

Blister Package Moisture Barrier Properties

The overall packaging Moisture Vapor Transmission Rates (MVTR) were calculated for a series of hypothetical blister packages corresponding to a combination of a blister film and a lidding material as listed in Table 8 relative to a conventional blister package having a conventional blister foil and a PVC blister film (example 8-1).

TABLE 8

Calculated Relative Moisture Vapor Transmission Rates (MVTR)

| Example | Blister Film | Lidding Material | Relative MVTR |
|---|---|---|---|
| 8-1 | 250μ PVC | Conventional Blister Foil | 100% |
| 8-2 | 300μ PP | C-1 | 33% |
| 8-3 | 300μ PP | C-2 | 33% |
| 8-4 | 300μ PP | C-3 | 33% |
| 8-5 | 300μ PP | C-4 | 33% |
| 8-6 | 300μ PP | C-5 | 369% |
| 8-7 | 300μ PP | Sample 1 | 96% |
| 8-8 | 300μ PP | Sample 2 | 96% |
| 8-9 | 300μ PP | Sample 3 | 102% |
| 8-10 | 300μ PP | Sample 4 | 112% |
| 8-11 | 300μ PP | Sample 5 | 112% |
| 8-12 | 300μ PP | Sample 6 | 102% |
| 8-13 | 300μ PP | Sample 7 | 112% |
| 8-14 | 300μ PP | Sample 8 | 143% |
| 8-15 | 300μ PP | Sample 9 | 125% |
| 8-16 | 300μ PP | Sample 10 | 104% |
| 8-17 | 250μ PP-COC-PP | C-1 | 12% |
| 8-18 | 250μ PP-COC-PP | C-2 | 12% |
| 8-19 | 250μ PP-COC-PP | C-3 | 12% |
| 8-20 | 250μ PP-COC-PP | C-4 | 12% |
| 8-21 | 250μ PP-COC-PP | C-5 | 347% |
| 8-22 | 250μ PP-COC-PP | C-6 | 481% |
| 8-23 | 250μ PP-COC-PP | Sample 1 | 74% |
| 8-24 | 250μ PP-COC-PP | Sample 2 | 74% |
| 8-25 | 250μ PP-COC-PP | Sample 3 | 80% |
| 8-26 | 250μ PP-COC-PP | Sample 4 | 90% |
| 8-27 | 250μ PP-COC-PP | Sample 5 | 90% |
| 8-28 | 250μ PP-COC-PP | Sample 6 | 80% |
| 8-29 | 250μ PP-COC-PP | Sample 7 | 90% |
| 8-30 | 250μ PP-COC-PP | Sample 8 | 121% |
| 8-31 | 250μ PP-COC-PP | Sample 9 | 103% |
| 8-32 | 250μ PP-COC-PP | Sample 10 | 82% |
| 8-33 | 250μ APET | C-1 | 207% |
| 8-34 | 250μ APET | C-2 | 207% |
| 8-35 | 250μ APET | C-3 | 207% |
| 8-36 | 250μ APET | C-4 | 207% |
| 8-37 | 250μ APET | C-5 | 542% |
| 8-38 | 250μ APET | Sample 1 | 269% |
| 8-39 | 250μ APET | Sample 2 | 269% |
| 8-40 | 250μ APET | Sample 3 | 275% |
| 8-41 | 250μ APET | Sample 4 | 285% |
| 8-42 | 250μ APET | Sample 5 | 285% |
| 8-43 | 250μ APET | Sample 6 | 275% |
| 8-44 | 250μ APET | Sample 7 | 285% |
| 8-45 | 250μ APET | Sample 8 | 316% |
| 8-46 | 250μ APET | Sample 9 | 298% |
| 8-47 | 250μ APET | Sample 10 | 277% |

PP refers to polypropylene; PP-COC-PP refers to layer of COC film between two layers of PP film; APET refers to amorphous poly(ethylene terephthalate).

It can be seen from Table 8 that the combination of the inventive lidding material with polypropylene (examples 8-7 through 8-16), in most cases, provides moisture protection similar to the conventional material (example 8-1). The use of APET as a blister film (examples 8-33 through 8-47), in all cases provides less moisture protection because of the properties of APET. However, use of PP/COC/PP blister film with the inventive lidding material (examples 8-23 through 8-32) on can significantly improve the overall moisture barrier properties of the blister package relative to comparison 8-1.

Blister package 8-1 having PVC film sealed to conventional blister foil, and blister package 8-25 having PP-COC-PP film sealed to inventive sample 3 were fabricated and their moisture transmission properties were compared. The samples were placed in a chamber at 45° C. and 100% relative humidity. FIG. 4 shows a plot of weight gain (mg) of each package versus time (days). One can see from FIG. 4 that the comparative package gains significantly more moisture weight with time relative to the inventive case.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

The invention claimed is:

1. A lidding material for blister packaging, wherein the lidding material consists of a first layer of paper and a second layer of a cyclic olefin copolymer; and a sealant layer adjacent to the second layer; wherein the lidding material is characterized by a Mullen burst strength of less than about 30 psi and a tear strength of less than about 50 g/in, and a moisture vapor transmission rate of less than about 0.3 g per 100 in² per day.

2. The lidding material of claim 1 wherein the lidding material is characterized by a Mullen burst strength of less than about 25 psi and a tear strength of less than about 30 g/in.

3. The lidding material of claim 1 wherein the lidding material is characterized by a Mullen burst strength of about 10 psi to about 30 psi and Machine Direction-tear strength of about 30 to about 100 grams-force.

4. The lidding material of claim 1 wherein the lidding material is characterized by a moisture vapor transmission rate of less than about 0.25 g per 100 in² per day.

5. The lidding material of claim 1 wherein the paper has a weight of about 10 to about 30 lbs/ream.

6. The lidding material of claim 1 wherein the cyclic olefin copolymer is a compound of Formula (I):

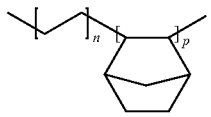

Formula I wherein, n and p independently represent integers and wherein n and p are chosen so that the melt temperature of the compound is greater than about 150° C.

7. The lidding material of claim 1 wherein the sealant layer is a polyolefin selected from the group consisting of:
a) polyethylene;
b) polypropylene;
c) ethylene acrylate copolymer;
d) ethylene acetate copolymer;
e) modified ethylene acrylate copolymer;
f) modified ethylene acetate copolymer;
g) ionomer; and
h) a mixture of two or more of a-g.

8. A lidding material for push-through blister packaging, wherein the lidding material consists of a first layer consisting of paper, one or more primer layers which consists of polyamine or polyacetate gravure coated on the first layer, one or more tie layers extrusion coated on the primer layer, one or more barrier layers extrusion coated on the tie layer, one or more sealant layers extrusion coated on the barrier layer, and provided a cyclic olefin is present in the at least one barrier layer and wherein the lidding material is characterized by a Mullen burst strength of less than about 30 psi and a tear strength of less than about 50 g/in, and a moisture vapor transmission rate of less than about 0.3 g per 100 in$^2$ per day.

9. The lidding material of claim 8 wherein an embrittling agent is mixed within at least one of the tie layer or the sealant layer wherein said embrittling agent constitutes an amount of about 5 to about 50% by weight.

10. The lidding material of claim 9 wherein the embrittling agent is a mineral.

11. The lidding material of claim 9 wherein the embrittling agent is one or more of:
a) calcium carbonate;
b) calcium sulfate;
c) glass fiber;
d) kaolin;
e) mica;
f) silica
g) talc
h) wollastonite; and
i) a mixture of two or more of a-h.

12. The lidding material of claim 9 wherein the embrittling agent is within the sealant layer.

13. The lidding material of claim 8 wherein the tie layer is selected from the group consisting of:
a) polyethylene;
b) ethylene acid copolymer;
c) ethylene acetate copolymer;
d) ethylene acrylate copolymer
e) ethylene anhydride copolymer
f) modified ethylene acrylate copolymer;
g) ionomer;
h) polypropylene;
i) anhydride-grafted polypropylene; and
j) a mixture of two or more of a-i.

14. A push-through blister packaging comprising a blister film heat sealed to the lidding material of claim 1.

15. A push-through blister packaging Comprising a blister film heat sealed to the lidding material of claim 8.

16. A lidding material for push-through blister packaging, wherein the lidding material consists of a first layer of paper, one or more primer layers which consists of polyamine or polyacetate gravure coated on the first layer, one or more tie layers extrusion coated on the primer layer, one or more barrier layers extrusion coated on the tie layer, one or more sealant layers extrusion coated on the barrier layer; and wherein at least one barrier layer consists of a cyclic olefin copolymer.

* * * * *